(12) United States Patent
Acar et al.

(10) Patent No.: US 9,390,264 B2
(45) Date of Patent: Jul. 12, 2016

(54) HARDWARE-BASED STACK CONTROL INFORMATION PROTECTION

(71) Applicant: QUALCOMM Incorporated, San Diego, CA (US)

(72) Inventors: Can Erkin Acar, San Diego, CA (US); Erich James Plondke, Austin, TX (US); Robert J. Turner, San Diego, CA (US); Billy B. Brumley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/256,681

(22) Filed: Apr. 18, 2014

(65) Prior Publication Data

US 2015/0302195 A1   Oct. 22, 2015

(51) Int. Cl.
G06F 21/56 (2013.01)
G06F 21/54 (2013.01)
G06F 21/52 (2013.01)

(52) U.S. Cl.
CPC ............ *G06F 21/56* (2013.01); *G06F 21/52* (2013.01); *G06F 21/54* (2013.01)

(58) Field of Classification Search
CPC .................................................. G06F 21/52
See application file for complete search history.

(56) References Cited

U.S. PATENT DOCUMENTS

| | | | |
|---|---|---|---|
| 8,509,431 B2 | 8/2013 | Schmidt et al. | |
| 2003/0065929 A1 | 4/2003 | Milliken | |
| 2003/0182572 A1 | 9/2003 | Cowan et al. | |
| 2003/0217277 A1 | 11/2003 | Narayanan | |
| 2008/0052468 A1* | 2/2008 | Speirs | G06F 13/4059 711/132 |
| 2013/0117843 A1 | 5/2013 | Komaromy et al. | |
| 2013/0179994 A1 | 7/2013 | Havercan | |
| 2013/0185792 A1 | 7/2013 | Balakrishnan et al. | |
| 2013/0205413 A1 | 8/2013 | Grocutt et al. | |
| 2014/0173290 A1* | 6/2014 | Kaplan | G06F 21/72 713/189 |
| 2014/0173293 A1* | 6/2014 | Kaplan | G06F 21/54 713/190 |
| 2014/0283088 A1* | 9/2014 | Alharbi | G06F 21/64 726/26 |
| 2014/0359773 A1* | 12/2014 | Matthews | G06F 21/52 726/24 |

OTHER PUBLICATIONS

Hardware and Binary Modification Support for Code Pointer Protection From Buffer Overflow; Nathan Tuck et al.; Proceedings of the 37th International Symposium on Microarchitecture (MICRO-37 2004); IEEE; 2004.*
StackGhost: Hardware Facilitated Stack Protection; Mike Frantzen et al.; SSYM'01 Proceedings of the 10th conference on USENIX Security Symposium; 2001.*

(Continued)

*Primary Examiner* — James Turchen
(74) *Attorney, Agent, or Firm* — Hunter Clark PLLC

(57) ABSTRACT

Techniques for protecting contents of a stack associated with a processor are provided. The techniques include a method including receiving a store instruction from a software program being executed by the processor, the store instruction including control information associated with a subroutine, altering the control information to generate secured control information responsive to receiving the store instruction from the software program, storing the secured control information on the stack, receiving a load instruction from the software program; and responsive to receiving the load instruction from the software program, loading the secured control information from the stack, altering the secured control information to recover the control information, and returning the control information to the software program.

12 Claims, 8 Drawing Sheets

(56) References Cited

OTHER PUBLICATIONS

International Search Report and Written Opinion—PCT/US2015/025685—ISA/EPO—Aug. 6, 2015, 10 pgs.

Second Written Opinion of the International Preliminary Examining Authority (EPO) for International Application No. PCT/US2015/025685, mailed Feb. 4, 2016, 6 pgs., European Patent Office, Pays Bas, The Netherlands.

* cited by examiner

Protecting Contents of Call Stack

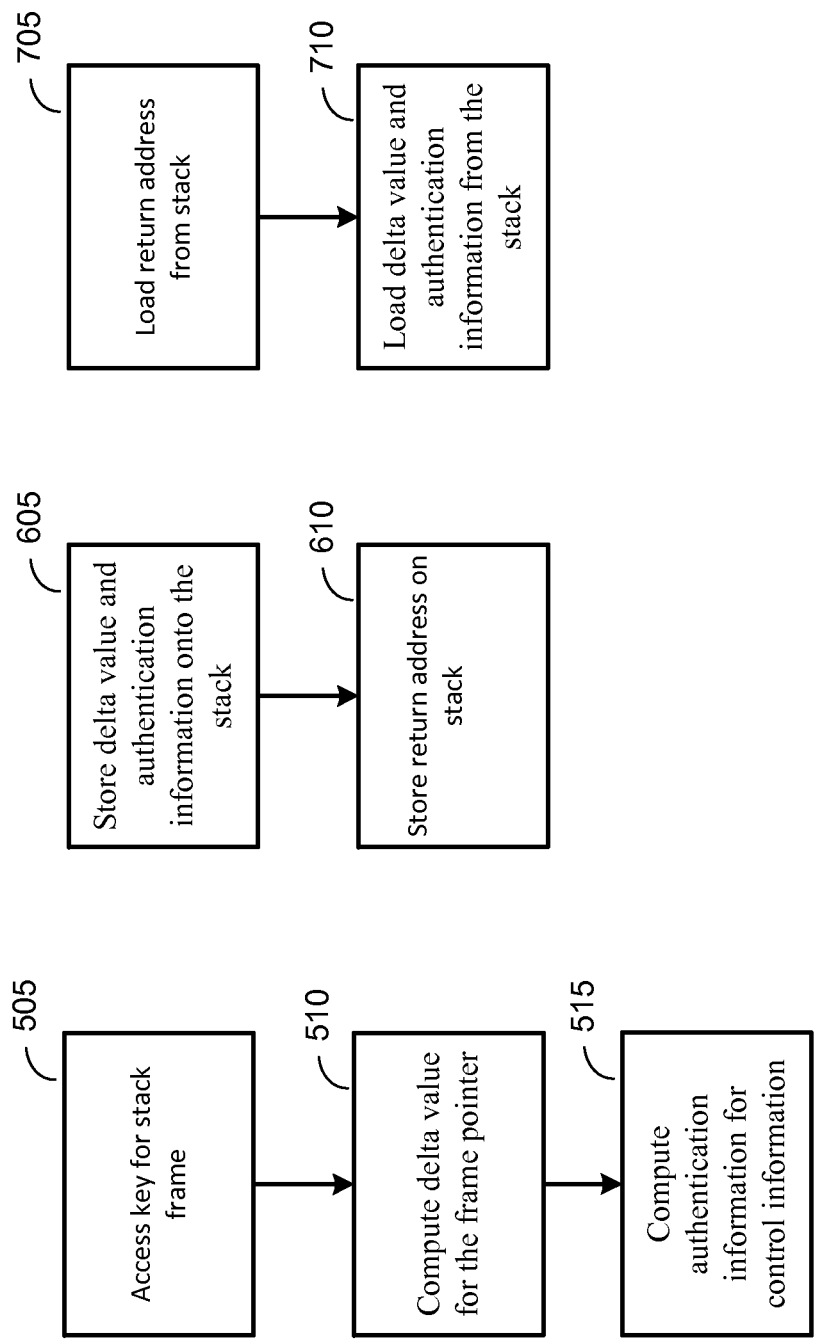

Control Data Authentication – Verify Control Data Not Changed

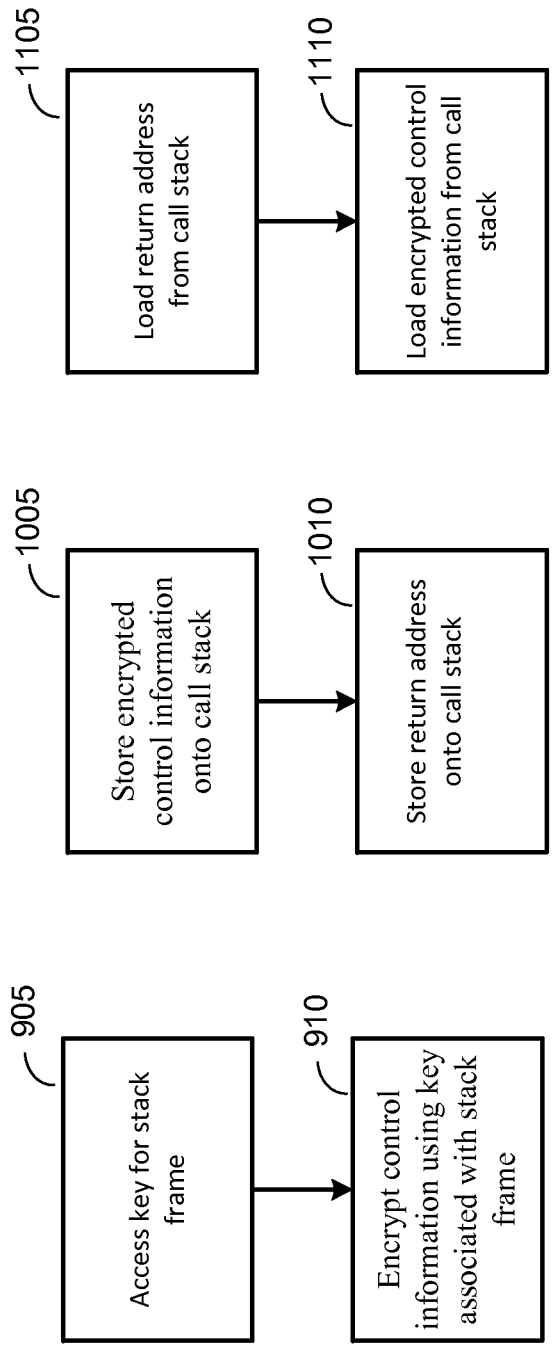

Control Data Encryption – Verify Control Data Not Changed

ND STACK CONTROL
HARDWARE-BASED STACK CONTROL
INFORMATION PROTECTION

BACKGROUND

Software implementation errors, such as missing or incorrect input validation, can lead to out-of-bounds buffer accesses and memory corruption. These implementation errors can lead to the software becoming unstable or eventually crashing under normal conditions. However, when an input is manipulated by a malicious party intent on attacking the computer system, these memory corruption and overflow bugs can be exploited by the attacker to change the expected behavior of the software code and to execute code or functionality determined by the attacker.

An attacker typically gains control of execution by overwriting a data structure in memory, such as a return address, a function pointer, or a virtual-table pointer. Finding and fixing all exploitable memory-corruption bugs in large and legacy code-bases is not always possible. Accordingly, many computer systems contain general defensive features, called "exploit mitigation mechanisms," that are effective against well-known techniques attackers use to exploit these bugs to gain control of and/or damage targeted computer systems.

Some examples of exploit mitigation mechanisms that are commonly included in computer systems include: Data Execution Prevention (DEP), Stack Protection (SP), and Address Space Layout Randomization (ASLR). In the DEP technique, all code sections are marked as read-only and all writable regions are non-executable. Typically, the read-only property of the code sections and the non-executable property of the writeable sections is enforced by the memory management unit (MMU) of the processor. This technique can prevent an attacker from placing their own code into a data area and directing execution flow to that code. In the SP approach, the compiler implements functions to detect buffer overflows on the stack. Stack-based buffer overflows can be easy to exploit, since there is often a return address or saved link-register on the stack right after a local array. An attacker can cause the local array to overflow and to overwrite the return address/link register and redirect execution flow of the software. Many conventional stack protection implementations insert a guard value onto the stack in the function prologue and check for modifications of that value before returning from that function. If a buffer overflow has occurred, the guard value will have been overwritten along with the return address, because the guard value is located in the stack between the buffer and the return address. The guard value must be a random and/or unpredictable value in order for the SP approach to be secure. In the ASLR approach, the memory layout of an application can be randomized at each execution. For example, the base address for code, static data, stack, and heap can be determined randomly. This approach makes exploitation difficult since attackers need to predict the location of the code/data/pointers they need to target/manipulate for a successful attack.

SUMMARY

An example method for protecting contents of a stack associated with a processor according to the disclosure includes receiving a store instruction from a software program being executed by the processor, the store instruction including control information associated with a subroutine, altering the control information to generate secured control information responsive to receiving the store instruction from the software program, storing the secured control information on the stack, receiving a load instruction from the software program, and responsive to receiving the load instruction from the software program, loading the secured control information from the stack, altering the secured control information to recover the control information, and returning the control information to the software program.

Implementations of such a method can include one or more of the following features. Altering the control information to generate the secured control information includes encrypting the control information to generate the secured control information. Encrypting the control information to generate the secured control information includes encrypting the control information using a block cipher-based message authentication code algorithm. Encrypting the control information to generate the secured control information includes encrypting the control information using a key associated with a current stack frame associated with the subroutine. Altering the secured control information to recover the control information includes decrypting the secured control information to recover the control information. Altering the control information to generate the secured control information includes adding an authentication tag to the control information to generate the secured control information. The authentication tag is associated with a current stack frame associated with the subroutine. Altering the secured control information to recover the control information includes deriving a frame pointer and a return address from the secured control information. Altering the secured control information to recover the control information includes applying a message authentication code to the frame pointer and the return address to produce a tag value, and comparing the tag value to the authentication tag included in the secured control information to verify that the control information was not altered while on the stack.

An example processor for protecting contents of a stack associated with the processor according to the disclosure includes means for receiving a store instruction from a software program being executed by the processor, the store instruction including control information associated with a subroutine, means for altering the control information to generate secured control information responsive to receiving the store instruction from the software program, means for storing the secured control information on the stack, means for receiving a load instruction from the software program; and responsive to receiving the load instruction from the software program, means for loading the secured control information from the stack, means for altering the secured control information to recover the control information, and means for returning the control information to the software program.

Implementations of such a processor can include one or more of the following features. The means for altering the control information to generate the secured control information includes means for encrypting the control information to generate the secured control information. The means for encrypting the control information to generate the secured control information include means for encrypting the control information using a block cipher-based message authentication code algorithm. The means for encrypting the control information to generate the secured control information includes means for encrypting the control information using a key associated with a current stack frame associated with the subroutine. The means for altering the secured control information to recover the control information includes means for decrypting the secured control information to recover the control information. The means for altering the control information to generate the secured control information includes means for adding an authentication tag to the control information to generate the secured control information. The authentication tag is associated with a current stack frame associated with the subroutine. The means for altering the secured control information to recover the control information includes means for deriving a frame pointer and a return address from the secured control information. The means for altering the secured control information to recover the control information include means for applying a message authentication code to the frame pointer and the return address to produce a tag value and means for comparing the tag value to the authentication tag included in the secured control information to verify that the control information was not altered while on the stack.

An example system according to the disclosure includes a memory, a stack in the memory for storing data associated with one or more subroutines, and a processor coupled to the memory. The processor is configured to execute processor-executable instructions configured to cause the processor to: receive a store instruction from a software program being executed by the processor, the store instruction including control information associated with a subroutine, alter the control information to generate secured control information responsive to receiving the store instruction from the software program, store the secured control information on the stack, receive a load instruction from the software program, and responsive to receiving the load instruction from the software program, the processor is configured to load the secured control information from the stack, alter the secured control information to recover the control information, and return the control information to the software program.

Implementations of such a system can include one or more of the following features. The processor being configured to alter the control information to generate the secured control information is further configured to encrypt the control information to generate the secured control information. The processor is configured to encrypt the control information using a block cipher-based message authentication code algorithm. The processor is configured to encrypt the control information using a key associated with a current stack frame associated with the subroutine. The processor is configured to decrypt the secured control information to recover the control information. The processor being configured to alter the control information to generate the secured control information is further configured to add an authentication tag to the control information to generate the secured control information. The authentication tag is associated with a current stack frame associated with the subroutine. The processor being configured to alter the secured control information to recover the control information is further configured to derive a frame pointer and a return address from the secured control information. The processor being configured to alter the secured control information to recover the control information is further configured to apply a message authentication code to the frame pointer and the return address to produce a tag value, and compare the tag value to the authentication tag included in the secured control information to verify that the control information was not altered while on the stack.

BRIEF DESCRIPTION OF THE DRAWINGS

FIG. 5 is a flow diagram of a process for altering control information to generate secured control information using a control data authentication technique.

FIG. 6 is a flow diagram of a process for storing secured control information on the stack.

FIG. 7 is a flow diagram of a process for loading secured control information from the stack.

FIG. 9 is a flow diagram of a process for altering control information to generate secured control information using a control data encryption technique.

FIG. 10 is a flow diagram of a process for storing secured control information on the stack.

FIG. 11 is a flow diagram of a process for loading secured control information from the stack.

DETAILED DESCRIPTION

Techniques disclosed herein are configured to provide hardware-based stack control information protection. The techniques can prevent a malicious attacker from modifying the contents of the return address (or link register), the frame pointer, and/or other control information on a stack in order to gain control of a computer system or cause the behavior of the software executed thereon from becoming unstable. The techniques disclosed herein include control data authentication and control data encryption techniques that can be used to identify when control information make it more difficult to successfully alter control information on a stack and to make it easier to identify when control information has been altered.

Example Hardware

Figure 1:
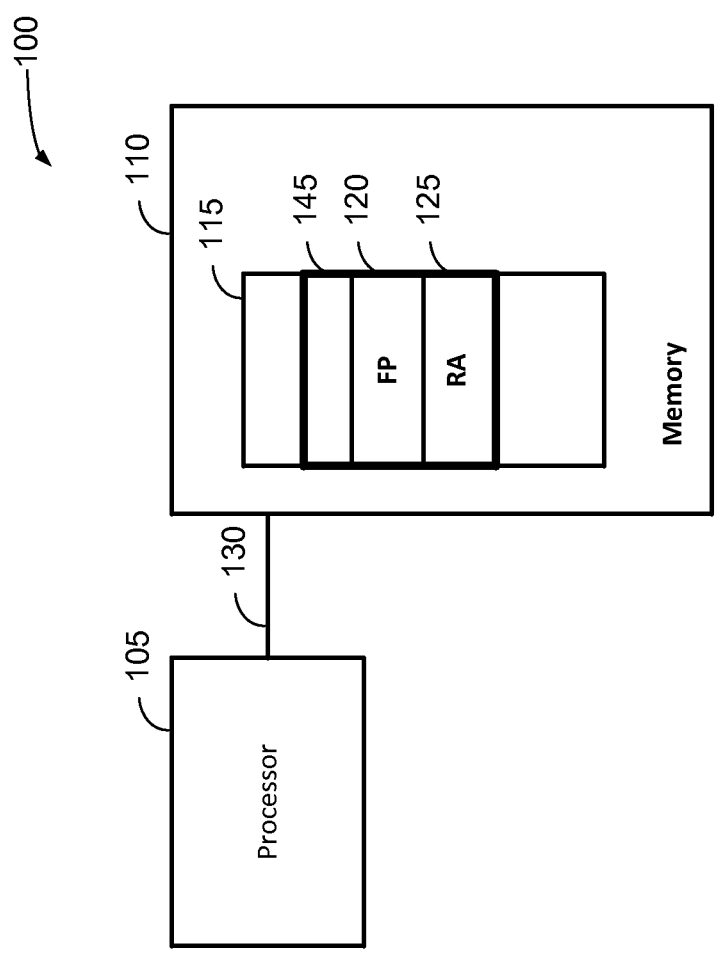
FIG. 1 is a functional block diagram of an example computer system in which the hardware-based stack control information protection techniques discussed herein can be implemented.

FIG. 1 is a functional block diagram of an example computer system 100 in which the hardware-based stack control information protection techniques discussed herein can be implemented. The hardware-based stack control information protection techniques disclosed herein can be used to prevent control information, such as the return address 125 and frame pointer 120 associated with a stack frame 145 of the stack 115 from being altered by a malicious attacker or by poorly written software code. The computer system illustrated in FIG. 1 can be used to implement the processes illustrated in FIGS. 4-12.

The computer system 100 includes a processor 105 and a memory 110. The processor 105 can be an intelligent device, e.g., a personal computer central processing unit (CPU) such as those made by Intel® Corporation or AMD®, a microcontroller, an application specific integrated circuit (ASIC), etc.

The memory 110 is a non-transitory storage device that can include random access memory (RAM) and/or other types of memory from which the processor 105 can read data and to which the processor 105 can write data. In some implementations, a portion of the memory 110 may be a read-only memory (ROM) that can include software instructions and/or data that may be read by the processor 105 but not updated.

The memory 110 can store processor-readable, processor-executable software code containing instructions for controlling the processor 105 to perform various functions such as those described herein (although the description may read that the software performs the function(s)). The software can be loaded onto the memory 260 by being downloaded via a network connection, uploaded from a disk, etc. Further, the software may not be directly executable, e.g., requiring compiling before execution.

The memory 110 can include a stack 115. The stack 115 is a data structure in the memory 110 that can be used to store data associated with one or more active subroutines of one or more software programs being executed by the processor 105. In some implementations, each software programs and/or thread being executed by the processor 105 can be associated with a different stack 115. The stack 115 can be comprised of one or more stack frames 145. The stack frame 145 contains state information for a subroutine which has not yet been terminated with a return by the processor 105. In a typical implementation of a stack, the stack frame that is located at the top of the stack is the stack frame associated with the subroutine currently being executed by the processor 105. The stack frame 145 can contain information associated with the subroutine, such as any parameter values that may have been passed to the subroutine by a routine calling that subroutine, and control information that can be used to control the flow of the software program and where the program accesses data. For example, the control information can include the return address (RA) 125 pointing back to the caller of the subroutine associated with the stack frame 145, and a frame pointer (FP) 120. The stack frame 145 can also be used to store other information associated with the subroutine.

The return address 125 points to the address of the instruction that called the subroutine associated with the stack frame 145 and can later be used by the processor 105 to return to the calling instruction that called the subroutine once the processor 105 has completed execution of the subroutine.

The frame pointer 120 points to an address at the start of a stack frame associated with a subroutine and does not change for the duration of the subroutine. The processor 105 may also be configured to maintain a stack pointer (SP) (not shown) that references the top of the stack 115. The value of the stack pointer changes as content is added to the stack, while the frame pointer 120 continues to point to the data associated with the stack frame. The frame pointer 120 can used to point to a fixed location within the stack frame, which allows the frame pointer 120 to be used as a fixed reference point that can be used to facilitate accessing of arguments and/or local variables associated with the subroutine associated with the stack frame. The location of the arguments and/or local variables can be determined as a fixed offset from the value of the frame pointer 120.

The techniques disclosed herein can be used to help prevent the return address 125 and/or the frame pointer 120 from being altered by poorly written code or through malicious attempts to attack the computer system 100. A malicious party may attempt to redirect the execution of program code by the processor 105 to an instruction that is different from the instruction that called a subroutine by overwriting the return address to be that of a different instruction. Malicious code can also alter the frame pointer which can be used to point to data inserted onto the stack by the attacker. An attacker may exploit stack buffer overflows in order to write data to the stack 115 outside of the stack data structure that was actually allocated to store the data. If the program code being executed by the processor 105 does not check to ensure that the data being written to the stack is actually sized properly for the buffer intended to store the data, the data on the stack 115 can become corrupted and/or an attacker may utilize such a technique to modify the frame pointer 120 and/or the return address 125 in order to assume control of the computer system 100. The techniques disclosed herein can be implemented in the hardware of the computer system 100 to make it more difficult to alter control information, such as the frame pointer 120 and the return address 125. Some implementations can also include verifying secured control information that has been loaded from the stack 115 before returning control information to a software program being executed by the processor 105.

The processor 105 provides a means for storing data on the stack 115 (in one aspect, a means for storing data on the stack 115 is a means for pushing data onto the stack 115). The processor 105 also provides a means for loading data from the stack 115 (in one aspect, a means for loading data from the stack 115 is a means for popping data from the stack 115). The processor 105 can also serve as a means for receiving store instruction and load instructions from a software program being executed by the processor 105. A store instruction can also include control information. The processor 105 provides a means for altering the control information to generate secured control information and for storing the secured control information on the stack 115. The processor 105 also provides means for loading the secured control information from the stack 115 and for altering the secured control information to recover the control information. The processor 105 can also provide means for encrypting the control information to generate secured control information and for decrypting the secured control information to recover the control information. The processor 105 can also provide means for adding an authentication tag to the control information to generate the secured control information. The processor 105 also provides means for altering the secured control information to recover the control information by deriving a frame pointer and a return address from the secured control information. The processor 105 can also provide means for applying a message authentication code to the frame pointer and the return address to produce a tag value and means for comparing the tag value to the authentication tag included in the secured control information to verify that the control information was not altered while on the stack. The processor 105 can provide means for implementing the stages of the processes illustrated in FIGS. 4-12, unless otherwise specified. FIGS. 4-12 are discussed in detail below.

The FIG. 1 illustrates only the processor 105 and the memory 110 for the sake of clarity. The computer system 100 can include additional elements such as network interfaces, input/output ports and/or input output devices, wireless interfaces, and/or other components not illustrated herein.

Figure 2:
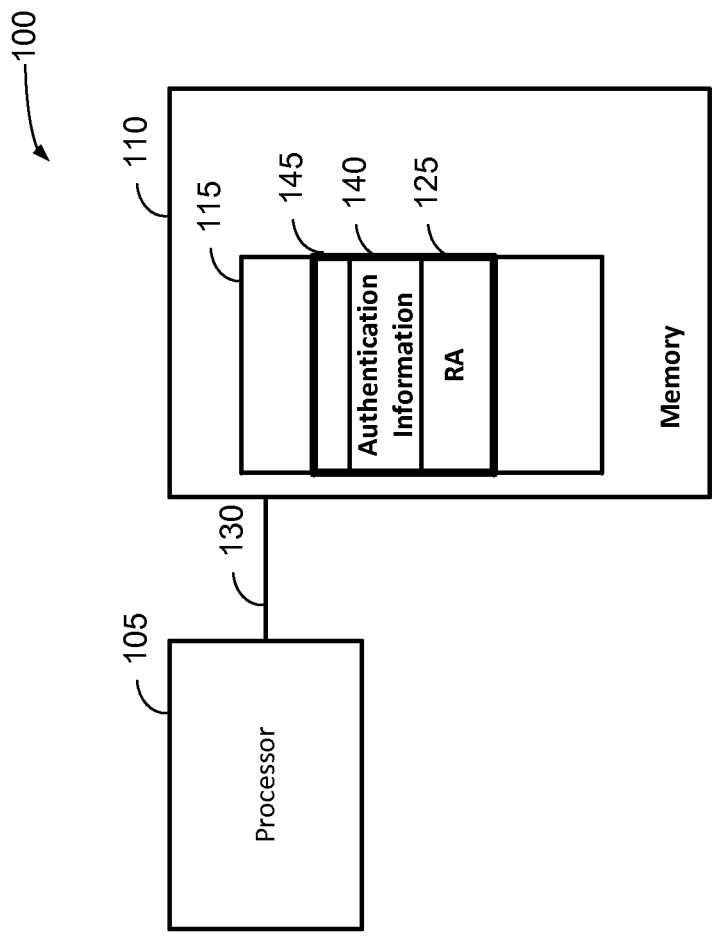
FIG. 2 is a functional block diagram of the example computer system from FIG. 1 illustrating the implementation of a control data authentication technique that can be used to implement the hardware-based stack control information techniques disclosed herein.

FIG. 2 is a functional block diagram of the example computer system 100 from FIG. 1 illustrating the implementation of a control data authentication technique that can be used to implement the hardware-based stack control information techniques disclosed herein. In the control data authentication technique illustrated in FIG. 2, secured control information in the form of authentication information 140 is generated and stored on the stack 115. In the implementation illustrated in FIG. 2, the authentication information 140 has been pushed onto the stack in place of the frame pointer 120. The authentication information 140 can be used to verify that the secured control information has not been altered while on the stack. For example, upon completion of a subroutine associated with the secured control information, the processor 105 can generate new authentication information based on the return address 125 loaded from the stack 115. The processor 105 can generate the new authentication information using the same technique that was used to generate the authentication information 140 that was pushed onto the stack 115. The processor 105 can compare the new authentication information generated from the return address 125 popped from the stack 115 with the authentication information 140 included in the authentication information 140. If the new authentication information does not match the authentication information 140 from the stack, the processor 105 can perform an exception handling routine to halt execution of an application being executed because the return address 125 has been altered or corrupted. If the new authentication information matches the authentication information 140, the return address 125 has not been altered or corrupted and the processor 105 can proceed with executing an instruction referred to by the return address 125. Additional details of the control data authentication technique illustrated in FIG. 2 are discussed below with respect to the processes illustrated in FIGS. 4-12.

Figure 3:
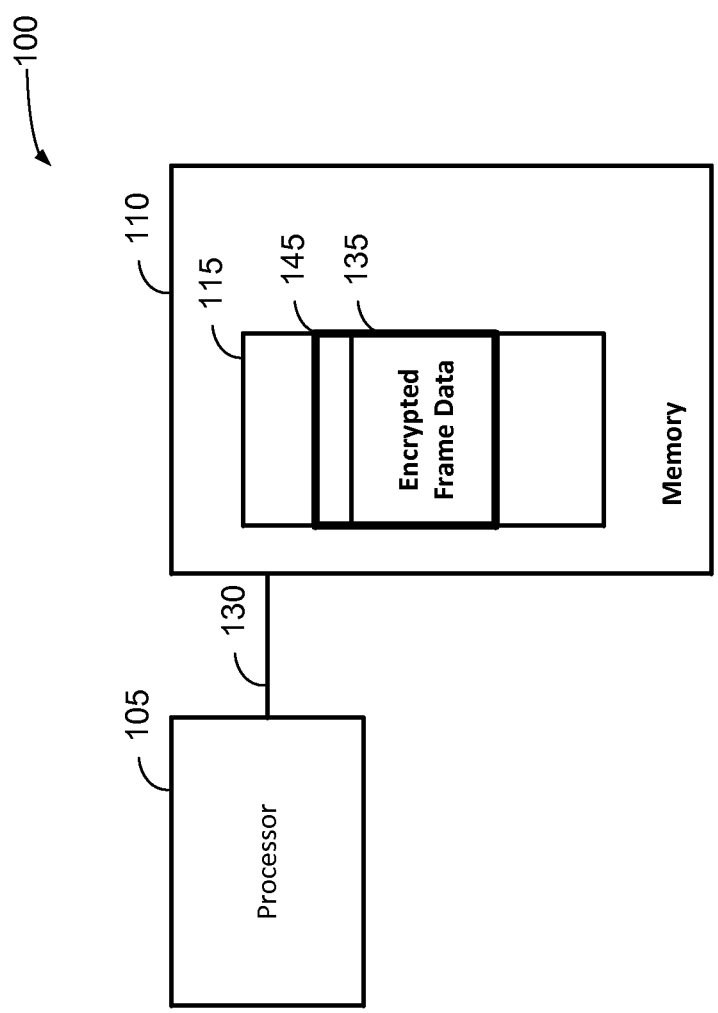
FIG. 3 is a functional block diagram of the example computer system from FIG. 1 illustrating the implementation of a control data encryption technique that can be used to implement the hardware-based stack control information techniques disclosed herein.

FIG. 3 is a functional block diagram of the example computer system 100 from FIG. 1 illustrating the implementation of a control data encryption technique that can be used to implement the hardware-based stack control information techniques disclosed herein. In the control data encryption technique illustrated in FIG. 3, secured control information in the form of encrypted frame data 135 is generated and pushed onto the stack. In the implementation illustrated in FIG. 3, the encrypted frame data 135 has been pushed onto the stack in place of the frame pointer 120 and the return address 125. The encrypted frame data 135 can be used to verify that the secured control information has not been altered while on the stack. For example, upon completion of a subroutine associated with the secured control information, the processor 105 can decrypt the encrypted frame data 135 to determine whether the encrypted frame data 135 was altered while on the stack 115. If the new encrypted frame data 135 was altered while on the stack 115, the processor 105 can be configured to perform an exception handling routine to halt execution of an application being executed because the control information has been altered or corrupted. If the encrypted frame data 135 was not altered while on the stack, the processor can obtain the frame pointer 120 and the return address 125 from the decrypted encrypted frame data 135 and can proceed with executing an instruction referred to by the return address 125. Additional details of the control data authentication technique illustrated in FIG. 3 are discussed below with respect to the processes illustrated in FIGS. 4-12.

Example Implementations

Figure 4:
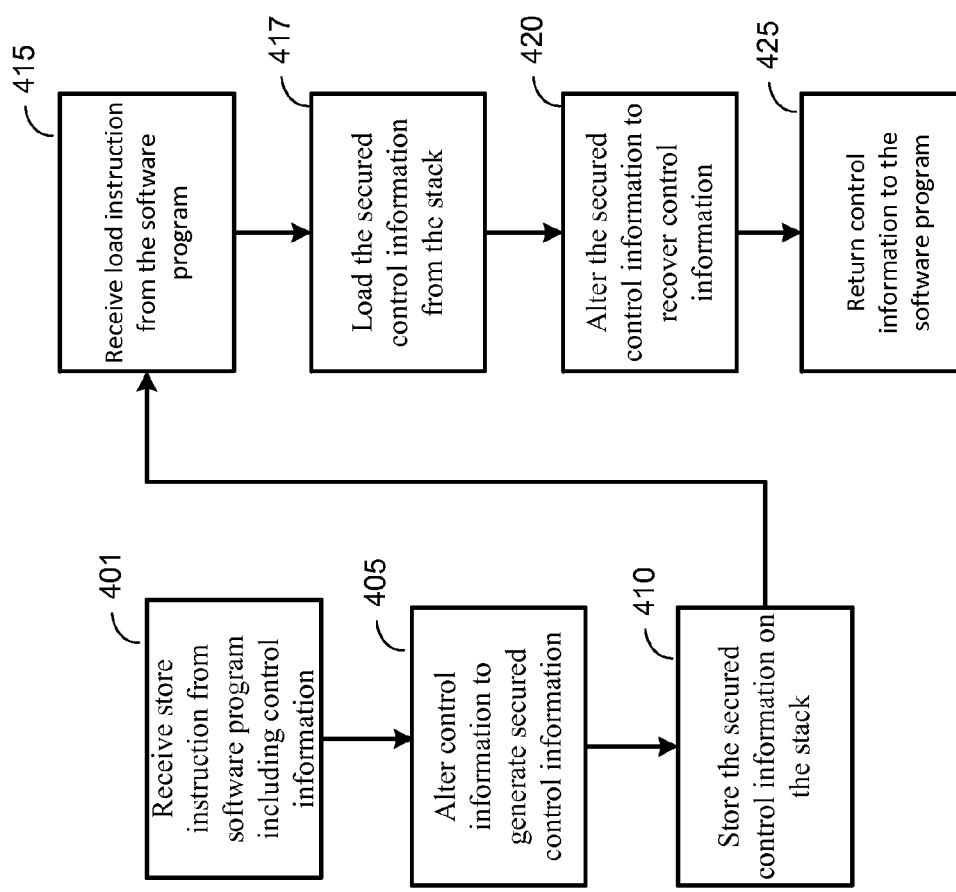
FIG. 4 is a flow diagram of a process for protecting the contents of a stack associated with a processor that can be used to implement the hardware-based stack control techniques disclosed herein.

FIG. 4 is a flow diagram of a process for protecting the contents of a stack associated with a processor that can be used to implement the hardware-based stack control techniques disclosed herein. The process illustrated in FIG. 4 can be implemented using the computer system 100 illustrated in FIG. 1. The example computer system 100 illustrated in FIG. 1 provides one example of one computer system in which the process illustrated in FIG. 4 may be implemented, and the process illustrated in FIG. 4 can be implemented by processors of a computer system having a different architecture than the example illustrated in FIG. 1.

The process can begin with receiving a store instruction from a software program being executed by the processor 105 (stage 401). The store instruction can include control information associated with a subroutine that the software program would like to have stored on the stack 115. Referring to the example computer system illustrated in FIG. 1, the processor 105 can be configured to store information associated with a subroutine of a software program being executed by the processor 105 on the stack 115 in response to receiving a store instruction received from the software program. For example, the processor 105 can be configured to push the frame pointer 120 and the return address 125 onto the stack 115 as part of the control information that is stored on the stack for the subroutine associated with stack frame 145. In other implementations, the control information may include other information in addition and/or instead of the frame pointer 120 and the return address 125.

The control information can then be altered to generate secured control information (stage 405). The processor 105 can be configured to use the control data authentication and/or the control data encryption techniques discussed herein to alter the control information associated with the software program. Altering the control information to make it more difficult for an attacker to assume control of the computer system 100 by altering the frame pointer 120, the return address 125, and/or other control information on the stack 115. In some implementations, the processor 105 can verify the secured control information has not been altered while on the stack 115. In the control data encryption techniques, the processor 105 is configured to encrypt the control information to generate the secured control information. An example process for generating the secure control information using a control data encryption technique is illustrated in FIG. 9. In the control data authentication techniques, the processor 105 is configured to generate an authentication tag which is added to control information and can be used to verify that the secured control information has not been altered while on the stack 115. The authentication tag can be created using a secret key that is known to the processor 105 but is not available to the software code being executed by the processor 105. In some implementations, the key may be implemented in the hardware of the processor or may be stored in a trusted memory component of the computer system 100 such that the contents of the trusted memory component cannot be accessed or altered by software code being executed on the computer system 100. Additional details of how the authentication tag may be generated are discussed in detail below. For example, the process illustrated in FIG. 5 discusses one technique that may be used to generate an authentication tag. The authentication tag can take into account the frame pointer 120, the return address 125, and/or other control information to be protected.

The secured control information can then be stored on the stack 115 (stage 410). In some implementations, the secured control information can be stored on the stack 115 instead of the control information. The example implementation illustrated in FIG. 3 provides an example of an implementation where the encrypted frame data 135 has been pushed onto the stack 115 instead of the unaltered control information that includes the frame pointer 120 and return address 125 as in the example illustrated in FIG. 1. In such an implementation, the unaltered control information is not available on the stack, which prevents malicious code and/or attacks by malicious parties from accessing the unprotected control data. In other implementations, at least a portion of the secured control information may be pushed onto the stack in addition to the control information and can be used to determine that the control information has not been altered while on the stack. The example implementation illustrated in FIG. 2 provides an example of an implementation where the authentication information 140 has been pushed onto the stack 115 instead of the frame pointer 120 as in the example illustrated in FIG. 1. The return address 125 has been pushed onto the stack 115 in addition to the authentication information 140. The authentication information in the example illustrated in FIG. 2 can be determined at least in part based on the frame pointer and the return address associated with the stack frame, and the authentication information 140 can be used to determine whether the return address and/or other information on the stack 115 has been altered.

A load instruction can be received from the software program being executed by the processor 105 (stage 415). The processor 105 can be configured to load the control information from the stack 115 in response to a load instruction from the software program and to provide the control information to the software program issuing the load instruction. In some implementations, the processor 115 can be configured to remove the control information (and/or the secured control information) from the stack 115 in response to the load instruction in order to free up memory on the stack 115. The process can continue with stages 417, 420, and 425 responsive to receiving the load instruction from the software program being executed by the processor 105.

The secured control information can be loaded from the stack (stage 417). The contents of the stack 115 associated with the subroutine can be popped off the stack 115 to free up the memory on the stack 115 in response to completing the subroutine. Part of this cleanup process can include popping the secured control information from the stack 115, and in some implementations, can include popping other control information from the stack.

Figure 8:
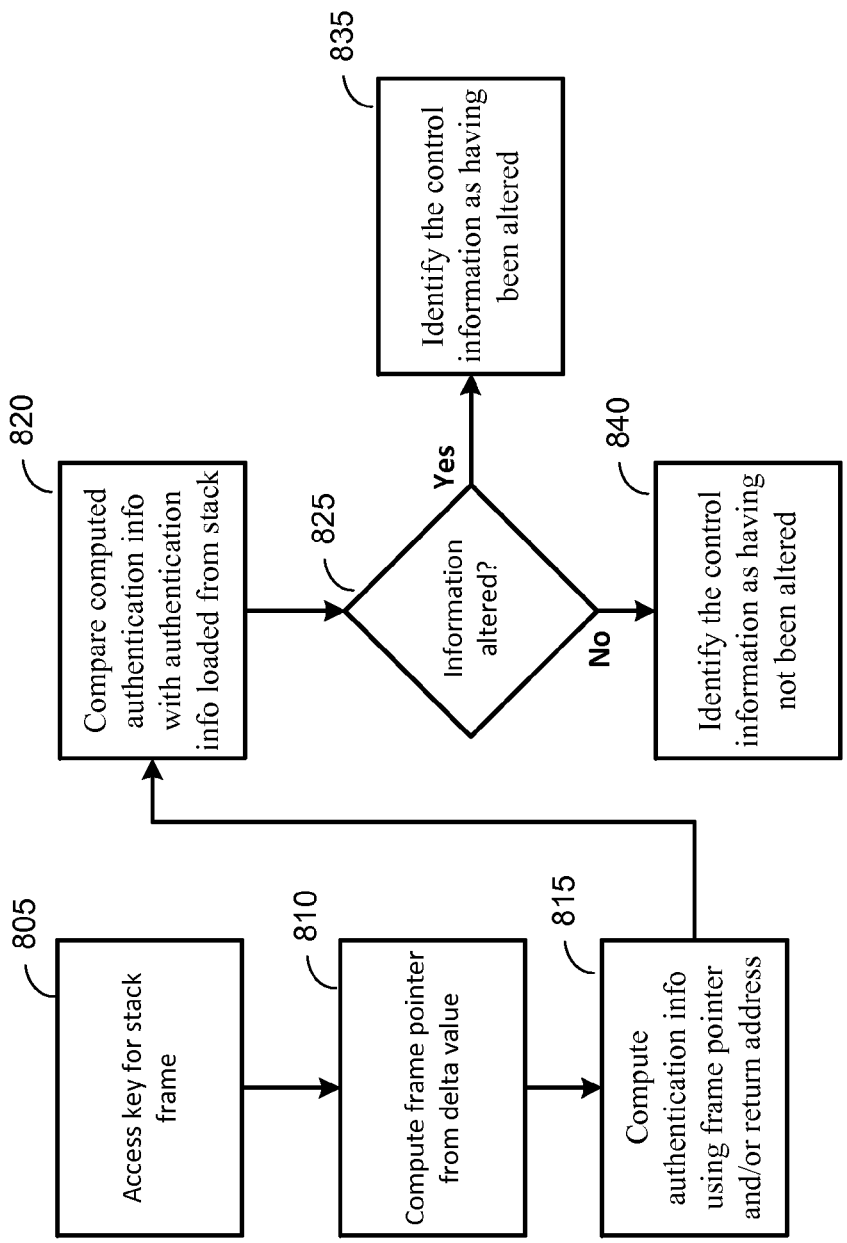
FIG. 8 is a flow diagram of a process for determining whether the secured control information generated using a control data authentication technique has been altered while on the stack.
Figure 12:
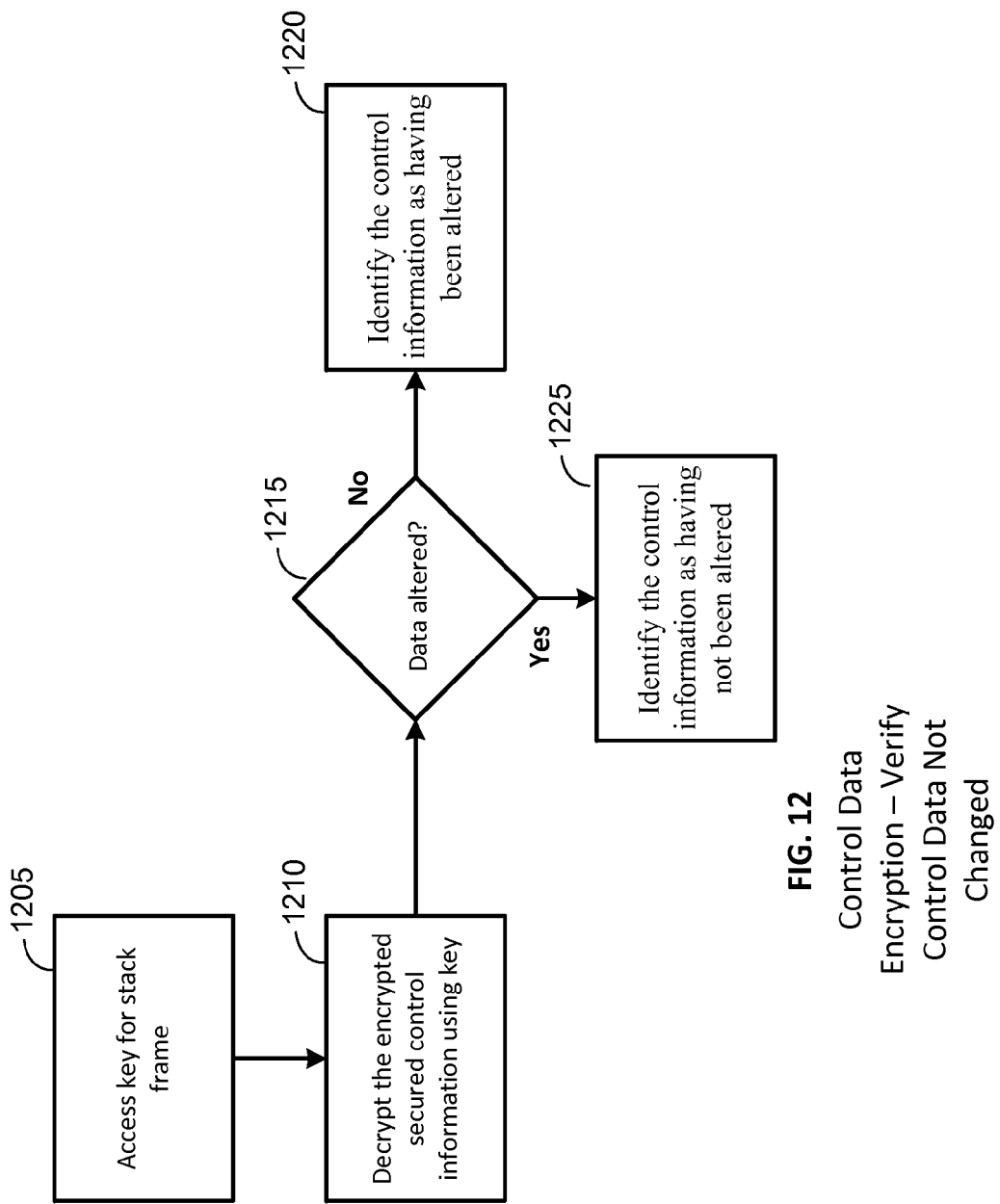
FIG. 12 is a flow diagram of a process for determining whether the secured control information generated using a control data encryption technique has been altered while on the stack.

The process can continue with altering the secured control information to recover the control information (stage 420). The processor 105 can be configured to recover the control information from the secured control information. How the processor 105 recovers whether secured control information has been altered depends on which technique was used to generate the secured control information. If a control data authentication technique was used to generate the secured control information, the authentication tag generated based on the control information for the stack frame 145 can be regenerated using the key that was used to generate the authentication tag pushed onto the stack and a determination can be made whether the newly generated key matches the key that was included in the secured control information for the stack frame 145 on the stack 115. If the newly generated authentication tag does not match the authentication tag included in the secured control information, then the secured control information has been corrupted or altered while on the stack 115. FIG. 8 can be used to recover the control information from the secured control information. If a control data encryption technique was used to generate the secured control information in stage 405, the encrypted frame data 135 comprising the secured control information that was pushed onto the stack for stack frame 145 can be decrypted using the appropriate key associated with the encryption technique used to encrypt the data in stage 405. If the encrypted frame data 135 does not decrypt properly using the decryption key associated with the key used to encrypt the control data, then the secured control information has been corrupted or altered while on the stack 115. FIG. 12 illustrates an example process for recovering the secured control information generated using a control data encryption technique.

The control information can then be returned to the software program (stage 425). The processor 105 can then return the control information to the software program that issued the load instruction to the processor 105. In some implementations, the processor 105 can be configured to determine whether the secured control data was altered and to throw an exception that can halt processing of the software program and/or perform other actions that can prevent malicious or poorly implemented code from utilizing control data that has been altered or corrupted. For example, where control data authentication is used and the authentication tags do not match, the processor 105 can halt execution of the software program or perform other handling tasks. In another example, where control data encryption is used, the processor 105 can be configured to determine whether the address associated with the frame pointer 120 and/or the return address 125 falls within a valid range of addresses. The processor 105 can be configured to halt execution of the software program or perform other handling tasks if the addresses fall outside the allowable ranges of address, which could indicate that the address information was altered or corrupted while on the stack 115.

FIG. 5 is a flow diagram of a process for altering control information to generate secured control information using a control data authentication technique. The process illustrated in FIG. 5 can be used to implement stage 405 of the process illustrated in the FIG. 4. The control data authentication technique can be used to generate an authentication tag based at least in part on the control information to be protected, and the authentication tag can be used to determine whether control information has been altered while on the stack 115. The process illustrated in FIG. 5 can be implemented by the processor 105 unless indicated otherwise.

A key associated with the stack frame can be accessed (stage 505). In some implementations, the same key can be used to generate the authentication tag for each of the stack frames. In other implementations, a different key can be selected from a plurality of keys so that each stack frame is associated with one of the plurality of keys. In some implementations, each stack frame may be associated with a different key and that key can be used to generate the authentication information for that stack frame. In some implementations, each stack frame on the stack 115 is associated with a unique key that will be used to generate the authentication information that can be used to verify that the control information associated with the stack frame 145, such as the frame pointer 120 and/or the return address 125, has not been altered while on the stack 115. In some implementations, the processor 105 can be configured to generate a key for each stack frame as the stack frame is created on the stack 115 and to store the key in a protected memory that is accessible to the processor 105 but is not accessible to software code being executed on the computer system 100. In some implementations, one or more keys may be stored in a trusted memory component of the computer system 100 to which the processor has access and the processor 105 can be configured to select a key to use to generated the authentication information associated with a stack frame from the one or more keys associated stored in the trusted memory component. The keys used to generate the authentication information for the stack frames on the stack 115 should be kept secret to prevent malicious users from being able to alter the control information and to generate new authentication information based on the altered control information. The keys can be reused once a stack frame associated with that key is popped off the stack 115.

The process can also include computing a delta value for the frame pointer 120 (stage 510). The frame pointer 120 can be encoded as a delta value representing an offset relative to the address of the stack pointer on the stack 115. The delta value can be sufficiently smaller than the frame pointer 120 that the space in memory originally allocated to store the frame pointer 120 can be used to store the delta value and the authentication information for the stack frame 145.

The process can also include computing authentication information for the control information associated with the stack frame (stage 515). The authentication information can be computed based on the return address 125, the frame pointer 120, the delta value of the frame pointer, and/or other control information that is to be monitored for unauthorized alterations while on the stack 115. In some implementations, the authentication tag comprises a message authentication code (MAC) tag that is computed using a MAC algorithm and the key accessed in stage 505. MAC tags can be generated and verified using the same key. The MAC algorithm can be based on a cryptographic hash function, a block cipher algorithm, universal hashing, or other types of technique. The processor 105 can be configured to keep track of which key was used to authenticate which stack frame on the stack 115 where at least some of the stack frames are authenticated using different keys. In other implementations, other types of techniques may be used to generate the authentication information by applying a process to the control information that can be used to verify the data integrity and authenticity of the secured control information.

FIG. 6 is a flow diagram of a process for storing on the stack secured control information generated using a control data authentication technique. The process illustrated in FIG. 6 can be used to implement stage 410 of the process illustrated in FIG. 4 where the process illustrated in FIG. 5 is used to implement stage 405 of the process illustrated in FIG. 4. The process illustrated in FIG. 6 can be implemented by the processor 105 unless otherwise indicated.

The delta value and the authentication information can be stored on the stack 115 (stage 605). The processor 105 can be configured to push the delta value and the authentication information onto the stack 115 instead of the frame pointer 120, because the delta value is derived from the frame pointer 120 and can be used to compute the value of the frame pointer 120 at a later time. The size of the delta value and the authentication information can allow the delta value and the authentication tag to fit into the same amount of memory on the stack 115 as the frame pointer 120. In some implementations, the authentication information comprises a MAC tag computed based on the secured control information to be protected, which may include the frame pointer 120, the delta value associated with the frame pointer, the return address 125, and/or other control information.

The return address 125 can also be stored on the stack 115 (stage 610). The return address 125 has not been altered and can be pushed onto the stack 115. If the return address 125 is changed while on the stack 115, the authentication tag included in the secured control information pushed onto the stack in stage 605 will not match the authentication tag that is generated based on the altered return address at the time that the control information is popped from the stack 115, which would signal to the processor 105 that the control information has been altered while on the stack 115 and that exception handling procedures should be executed.

FIG. 7 is a flow diagram of a process for retrieving secured control information from the stack 115 that was generated using a control data authentication technique. The process illustrated in FIG. 7 can be used to implement stage 417 of the process illustrated in FIG. 4. The process illustrated in FIG. 7 can be implemented by the processor 105 unless otherwise indicated. The process illustrated in FIG. 7 can be used to retrieve the information stored on the stack 115 in the process illustrated in FIG. 6.

The process can include loading the return address 125 from the stack 115 (stage 705). The delta value and the authentication information can also be loaded from the stack (stage 710). As discussed above with respect to the process illustrated in FIG. 6, the return address 125 can be pushed onto the stack 115 without altering the return address 125. If the return address 125 has been altered while on the stack 115, the authentication tag included with the secured control information pushed onto the stack will not match an authentication tag generated from the control information that has been popped off the stack.

FIG. 8 is a flow diagram of a process for determining whether the secured control information generated using a control data authentication technique has been altered while on the stack. The process illustrated in FIG. 8 can be used to implement at least a portion of stage 425 of the process illustrated in FIG. 4 where the processor 105 is optionally configured to verify that the control information has not been altered while on the stack 115 before returning the control information to the software program that has requested the control information. The process illustrated in FIG. 8 can be used to verify that secured control information created using the process illustrated in FIG. 5 has not been altered while on the stack 115. The process illustrated in FIG. 8 can be implemented by the processor 105.

The key associated with the stack frame can be accessed (stage 805). The key associated with the stack frame can be stored in a protected memory that is accessible to the processor 105 but not to unauthorized program code being executed by the processor 105 to prevent malicious parties from obtaining access to the keys used to generate the authentication information used to ensure that the control information has not been altered while on the stack 115. As discussed above, the key can be associated with a message authentication code (MAC). The key associated with the stack frame can be used to authenticate the contents of the secured control information by computing an authentication tag based on the control information obtained from the stack 115 at the time that the control information is loaded/popped from the stack 115. In the event the control information has been altered while on the stack 115, the computed authentication tag will not match the authentication tag that was stored on/pushed onto the stack 115 in stage 605 of the process illustrated in FIG. 6.

The frame pointer 120 associated with the stack frame can be computed from the delta value popped from the stack 115 (stage 810). The frame pointer 120 can be encoded as a delta value representing an address on the stack 115 relative to the stack pointer. Storing the delta value on the stack 115 instead of the frame pointer can free up space on the stack 115 that can be used to store the authentication information for the stack frame. The frame pointer 120 can be computed from the delta value by adding the offset of the delta value to the address represented by the stack pointer.

Authentication information can be computed using the frame pointer 120, the return address 125, and/or other control information using the key associated with the stack frame 145 (stage 815). The authentication information should be computing using the same technique that was used to compute the authentication information that was stored on/pushed onto the stack 115. For example, if a particular MAC algorithm was used to generate a MAC tag from the frame pointer 120, the return address 125, and/or other control information, the same MAC algorithm should be applied to the same control information elements that were used to generate the MAC tag included in the authentication information that was stored on/pushed onto the stack 115.

The authentication information computed using the frame pointer 120, the return address 125, and/or other control information and using the key associated with the stack frame can be compared with the authentication information included with the secured control information that was stored on the stack 115 as part of the secured control information (stage 820). For example, if the authentication information comprises a MAC tag, the MAC tag included in the secured control information can be compared to a MAC tag computed using the frame pointer 120, the return address 125, and/or other control information popped from the stack 115. A determination can be made whether the computed authentication tag matches the authentication tag that was obtained from the stack 115 (stage 825). If the computed authentication tag does not match the authentication tag obtained from the stack 115, the secured control information can be identified as having been altered since the secured control information was pushed onto the stack 115 (stage 835). Otherwise, if the computed authentication tag does match the authentication tag obtained from the stack 115, the secured control information can be identified as not having been altered since the secured control information was pushed onto the stack 115 (stage 840).

FIG. 9 is a flow diagram of a process for altering control information to generate secured control information using a control data encryption technique. The process illustrated in FIG. 9 can be used to implement stage 405 of the process illustrated in the FIG. 4. The control data encryption technique can be used to encrypt the control information to be protected while on the stack 115. The process illustrated in FIG. 9 can be implemented by the processor 105 illustrated in FIG. 1 unless otherwise indicated.

A key associated with the stack frame 145 can be accessed (stage 905). The encryption key associated with the stack frame can be stored in a protected memory that is accessible to the processor 105 but not accessible to unauthorized program code being executed by the processor 105 to prevent an attacker from obtaining access to the keys used to encrypt and decrypt the secured control data to ensure that the secured control information is altered while on the stack 115. The encryption key associated with the stack frame can be used to decrypt the contents of the secured control information at the time that the control information is popped from the stack 115. In the event the control information has been altered while on the stack 115, the decryption key will produce invalid results. In some implementations, the encryption key used to encrypt the secured control data may be the same key that is used to decrypt the secured control data. In other implementations, the encryption and decryption keys may be different keys. In some implementations, the same encryption key may be used to encrypt data for multiple stack frames, and each stack frame may not be associated with a different key. In some implementations, the processor 105 can have access to a pool of encryption and decryption keys, and the processor 105 can select an encryption key to be used to generate the secured control information for a particular stack frame from the pool of available encryption keys.

The control information associated with the stack frame can be encrypted using the key associated with the stack frame to produce secured control information (stage 910). The control information can include the return address 125 and/or the frame pointer 120. The control information may include additional information in other implementations. Encrypting the control information can prevent unauthorized alterations being made to the control information while the secured control information is on the stack 115.

FIG. 10 is a flow diagram of a process for storing secured control information onto the stack generated using a control data encryption technique. The process illustrated in FIG. 10 can be used to implement stage 410 of the process illustrated in FIG. 4. The secured control information comprises encrypted frame data 135 and may include additional control information or other information.

The encrypted control information can be stored on/pushed onto the stack 115 (stage 1005). The encrypted control information (also referred to herein as encrypted frame data 135) may be associated with a particular stack frame 145. The processor 105 can be configured to push the secured control information encrypted in stage 910 of the process illustrated in FIG. 9 onto the stack 115. The encrypted frame data 135 can be pushed onto the stack 115 in preparation for the processor 105 executing another subroutine and the information for a subroutine currently being executed is pushed onto the stack for the subroutine currently being executed. Pushing the control information onto the stack in encrypted form can prevent an attacker from altering the control information by altering the contents of the stack 115. An attacker would need to have knowledge of the key used to encrypt the secured control information to be able to successfully modify the return address or other information included in the secured control information.

The return address 125 can also optionally be stored on/pushed onto the stack (stage 1010). In some implementations, the return address 125 may also be pushed onto the stack in addition to the secured control information. In such implementations, the return address can be used for branch prediction and/or other techniques that make use of the return address. The return address 125 can be verified by decrypting the secured control information to verify that the return address was not altered while on the stack 115.

FIG. 11 is a flow diagram of a process for retrieving secured control information from the stack 115 that was generated using a control data encryption technique. The process illustrated in FIG. 11 can be used to implement stage 415 of the process illustrated in FIG. 4. The process illustrated in FIG. 11 may be performed by the processor 105 upon completion of a subroutine associated with the stack frame 145. The processor 105 can be configured to remove the information loaded from the stack 115 from the stack 115 in order to free up space in the memory 110.

The return address can be loaded from of the stack 115 if the return address was pushed onto the stack 115 (stage 1105). The processor 105 can be configured to pop the return address off of the stack 115 if the return address was pushed onto the stack in stage 1010 of the process illustrated in FIG. 10. In some implementations, the return address is not pushed onto the stack and the process can proceed to stage 1110 where the secured control information is popped from the stack.

The encrypted secured control information can be loaded from the stack 115 (stage 1110). The processor 105 can pop the secured control information from the stack 115. For example, the processor 105 can pop the secured control information from the stack 115 upon completion of a subroutine associated with the stack frame 145 as part of the cleanup of the stack frame 145. The secured control information can then be decrypted and verified. If the secured control information has not been altered while on the stack 115, the processor 105 can proceed to execute a subroutine indicated by the return address. Otherwise, the processor 105 can execute exception handling procedures in the event that the secured control information has been altered while on the stack 115.

FIG. 12 is a flow diagram of a process for determining whether the secured control information generated using a control data encryption technique has been altered while on the stack 115. The process illustrated in FIG. 12 can be used to implement at least a portion of stage 425 of the process illustrated in FIG. 4 where the processor 105 is optionally configured to verify that the control information has not been altered while on the stack 115 before returning the control information to the software program that has requested the control information.

The key associated with the stack frame can be accessed (stage 1205). The key associated with the stack frame can be stored in a protected memory that is accessible to the processor 105 but not to unauthorized program code being executed by the processor 105 to prevent malicious parties from obtaining access to the keys used to encrypt the encrypted frame data 135 to ensure that the secured control information is altered while on the stack 115. The key associated with the stack frame can be used to decrypt the contents of the secured control information at the time that the control information is popped from the stack 115. In some implementations, the key used to encrypt the encrypted frame data 135 may be the same as they key that can be used to decrypt the secured control information. In other implementation, the keys used to encrypt and to decrypt the secured control information are different keys. The processor 105 can be configured to track which stack frames have been encrypted with which encryption key where multiple encryption keys are available and to select the appropriate decryption key for decrypting the encrypted frame data 135.

The encrypted secured control information can be decrypted using the key to recover the control information (stage 1210), and a determination can be made whether the encrypted control information was altered or corrupted while on the stack 115 (stage 1215). The processor 105 can be configured to decrypt the encrypted frame data 135 using the key obtained in stage 1205. The processor 105 can be configured to determine whether the encrypted frame data 135 has been altered by comparing addresses in the control information recovered by decrypting the encrypted frame data 135 to a valid range of addresses. If the frame pointer 120 and/or the return address 125 in the control information recovered by decrypting the encrypted frame data 135 falls outside this range, the encrypted frame data 135 may have been altered or corrupted while on the stack 115.

If the data has been altered or corrupted, the secured control information can be identified as having been altered (stage 1220). Otherwise, the secured control information can be identified as having not been altered (stage 1225). Responsive to an indication that the data has been altered, the processor 105 can be configured to throw an exception that can halt processing of the software program and/or perform other actions that can prevent malicious or poorly implemented code from utilizing control data that has been altered or corrupted. Responsive to an indication that the data has not been altered, the processor 105 can be configured to return the control data to the software program that has issued the load command to the processor 105 (see stage 405 of the process illustrated in FIG. 4).

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for protecting contents of a stack associated with a processor comprising:
   receiving a store instruction from a software program being executed by the processor, the store instruction including control information associated with a subroutine;
   altering the control information to generate secured control information responsive to receiving the store instruction from the software program using a frame-specific key associated with a current stack frame associated with the subroutine by
      generating an authentication tag using the frame-specific key and the control information, such that the control information for each stack frame is altered using a different frame-specific key, and
      adding the authentication tag to the control information to generate the secured control information to be stored on the stack;
   storing the secured control information on the stack;

receiving a load instruction from the software program; and responsive to receiving the load instruction from the software program,
loading the secured control information from the stack,
altering the secured control information to recover the control information, and
returning the control information to the software program.

2. The method of claim 1 wherein the authentication tag is associated with a current stack frame associated with the subroutine.

3. The method of claim 1 wherein altering the secured control information to recover the control information comprises deriving a frame pointer and a return address from the secured control information.

4. The method of claim 3 wherein altering the secured control information to recover the control information comprises:
applying a message authentication code to the frame pointer and the return address to produce a tag value; and
comparing the tag value to the authentication tag included in the secured control information to verify that the control information was not altered while on the stack.

5. A processor for protecting contents of a stack associated with the processor, the processor comprising:
means for receiving a store instruction from a software program being executed by the processor, the store instruction including control information associated with a subroutine;
means for altering the control information to generate secured control information responsive to receiving the store instruction from the software program using a frame-specific key associated with a current stack frame associated with the subroutine, such that the control information for each stack frame is altered using a different frame-specific key, the means for altering the control information further comprising
means for generating an authentication tag using the frame-specific key and the control information, and
means for adding the authentication tag to the control information to generate the secured control information to be stored on the stack;
means for storing the secured control information on the stack;
means for receiving a load instruction from the software program; and
responsive to receiving the load instruction from the software program,
means for loading the secured control information from the stack,
means for altering the secured control information to recover the control information, and
means for returning the control information to the software program.

6. The processor of claim 5 wherein the authentication tag is associated with a current stack frame associated with the subroutine.

7. The processor of claim 5 wherein the means for altering the secured control information to recover the control information comprises means for deriving a frame pointer and a return address from the secured control information.

8. The processor of claim 7 wherein the means for altering the secured control information to recover the control information comprises:
means for applying a message authentication code to the frame pointer and the return address to produce a tag value; and
means for comparing the tag value to the authentication tag included in the secured control information to verify that the control information was not altered while on the stack.

9. A system comprising:
a memory;
a stack in the memory for storing data associated with one or more subroutines; and
a processor coupled to the memory, the processor being configured to execute processor-executable instructions configured to cause the processor to:
receive a store instruction from a software program being executed by the processor, the store instruction including control information associated with a subroutine;
alter the control information to generate secured control information responsive to receiving the store instruction from the software program using a frame-specific key associated with a current stack frame associated with the subroutine, such that the control information for each stack frame is altered using a different frame-specific key, the processor being further configured to
generate an authentication tag using the frame-specific key and the control information; and
add the authentication tag to the control information to generate the secured control information to be stored on the stack;
store the secured control information on the stack;
receive a load instruction from the software program; and
responsive to receiving the load instruction from the software program, the processor is configured to
load the secured control information from the stack,
alter the secured control information to recover the control information, and
return the control information to the software program.

10. The system of claim 9 wherein the authentication tag is associated with a current stack frame associated with the subroutine.

11. The system of claim 9 wherein the processor being configured to alter the secured control information to recover the control information is further configured to derive a frame pointer and a return address from the secured control information.

12. The system of claim 11 wherein the processor being configured to alter the secured control information to recover the control information is further configured to:
apply a message authentication code to the frame pointer and the return address to produce a tag value; and
compare the tag value to the authentication tag included in the secured control information to verify that the control information was not altered while on the stack.

* * * * *